United States Patent [19]
Kondo

[11] Patent Number: 6,167,269
[45] Date of Patent: Dec. 26, 2000

[54] TERMINAL ASSISTED HANDOFF MOBILE COMMUNICATION SYSTEM IN WHICH IMPROVEMENT IS CARRIED OUT AS REGARDS A HANDOFF SYSTEM

[75] Inventor: Seiji Kondo, Saitama, Japan

[73] Assignee: NEC Corporation, Tokyo, Japan

[21] Appl. No.: 09/081,632

[22] Filed: May 20, 1998

[30] Foreign Application Priority Data

May 21, 1997 [JP] Japan .................................. 9-130660

[51] Int. Cl.[7] .................................................. H04Q 7/20
[52] U.S. Cl. .......................... 455/437; 455/436; 455/442
[58] Field of Search .................... 455/436, 447, 455/437–438, 439, 513, 509, 527, 442, 525, 422, 450; 370/331, 335, 350, 332

[56] References Cited

U.S. PATENT DOCUMENTS

| 5,487,174 | 1/1996 | Persson ..................................... 455/436 |
| 5,548,808 | 8/1996 | Bruckert et al. ......................... 455/436 |
| 5,680,395 | 10/1997 | Weaver, Jr. et al. ..................... 370/331 |
| 5,710,986 | 1/1998 | Obayashi ................................. 455/553 |
| 5,883,888 | 3/1999 | St. Pierre ................................. 370/331 |
| 5,937,019 | 8/1999 | Padovani ................................. 455/438 |
| 5,999,816 | 12/1999 | Tiedemann, Jr. et al. .............. 455/436 |

FOREIGN PATENT DOCUMENTS

| 0 624 994 A1 | 11/1994 | European Pat. Off. . |
| 4-502845 | 5/1992 | Japan . |
| 6-326652 | 11/1994 | Japan . |

OTHER PUBLICATIONS

European Search Report dated Feb. 9, 2000.
Baier et al., "Design Study for a CDMA–Based Third–Generation Mobile Radio System", IEEE Journal on Selected Areas in Communications, pps. 733–43, vol. 12, No. 4, May 1994.
Japanese Office Action dated Jun. 22, 1999, with partial translation.

Primary Examiner—Nay Maung
Assistant Examiner—Jean A Gelin
Attorney, Agent, or Firm—McGinn & Gibb, PLLC

[57] ABSTRACT

In a fixed facility for a mobile communication system including a mobile terminal, the fixed facility covers a first and a second radio zone which are assigned with a first and a second radio frequency, respectively. The mobile terminal is communicable with the fixed facility by the use of, as a current radio frequency, one of the first and the second radio frequencies and is capable of producing a request signal representative of request of a handoff in which the mobile terminal is communicable with the fixed facility by the use of another of the first and the second radio frequencies at a boundary area between the first and the second radio zones. The fixed facility has a judging arrangement which is responsive to the request signal and judges whether or not the second radio frequency is usable by the mobile terminal. The fixed facility further has a signal transmitting arrangement transmits a command signal, relating to the handoff, towards the mobile terminal through the current radio frequency in response to a judgement result derived from the judging arrangement.

16 Claims, 8 Drawing Sheets

TERMINAL ASSISTED HANDOFF MOBILE COMMUNICATION SYSTEM IN WHICH IMPROVEMENT IS CARRIED OUT AS REGARDS A HANDOFF SYSTEM

BACKGROUND OF THE INVENTION

The present invention relates to a mobile communication system and, in particular, to a terminal assisted handoff mobile communication system in which a handoff is requested from a mobile terminal to a host station.

In a mobile communication system, such as a cellular system, a base station radio device or a radio base station is arranged in each of several radio zones. Upon reaching a boundary between the radio zones, a terminal establishing communication with a base station radio device under the best propagation condition starts communication with a new base station radio device to maintain communication. This function is called handoff or hand-over.

In a code division multiple access (CDMA) cellular system, radio zones are identified using different spreading codes, respectively. Accordingly, it is not necessary to allocate different frequencies to the respective radio zones as required in a frequency division multiple access (FDMA) cellular system or a time division multiple access (TDMA) cellular system. That is, the same frequency can be allocated to base station radio devices arranged in the respective radio zones. Accordingly, in the CDMA cellular system, upon reaching a boundary between the radio zones, a terminal in communication with a certain base station radio device can also simultaneously communicate with one or more base station radio devices in the adjacent radio zones. Thus, a continuous or non-hit handoff can be achieved. A handoff of this type is called a soft handoff, wherein a terminal shifts from a current radio zone to an adjacent radio zone using the same frequency.

FIG. 6 schematically shows a structure of a conventional terminal assisted handoff CDMA cellular system. The cellular system shown includes a base station controller (host station) 12 and base station radio devices 10a, 10b connected thereto. For example, a terminal 11 communicating with the radio device 10b on a traffic channel of a spreading code b1×b2 receives a pilot channel of a spreading code a1 transmitted from the radio device 10a covering an adjacent radio zone and constantly measures a reception level thereof. If the measured reception level exceeds a preset threshold value, the terminal 11 determines that it has entered a soft handoff radio zone and transmits a soft handoff start-up request signal carrying identification data of the radio device 10a to the radio device 10b now in communication, using the traffic channel of the spreading code b1×b2.

Pilot channels transmitted from the base station radio devices 10a, 10b are spread by different spreading codes, such as a1 and b1, for identification of the radio zones. In the IS-95-A, the spreading codes a1 and b1 are PN (pseudorandom noise) code sequences, and spreading codes which differ per radio zone are allocated to the respective base station radio devices by time offset.

The base station controller 12 receives the start-up request signal from the terminal 11 via the base station radio device 10b now in communication. Then, the base station controller 12 transmits a soft handoff start-up signal to the base station radio device 10a represented by the identification data carried on the start-up request signal. Upon reception of the start-up signal, the radio device 10a starts communication with the terminal 11. Simultaneously, the base station controller 12 transmits a soft handoff command signal to the terminal 11 via the radio device 10b for notification of a spreading code a1×a2 to be used on a traffic channel of the radio device 10a. Upon reception of the soft handoff command signal, the terminal 11 recognizes the new spreading code a1×a2 and starts communication with the radio device 10a while communicating with the radio device 10b, so as to shift to the radio zone of the radio device 10a.

As described above, a terminal in communication measures a reception level of a pilot channel transmitted from a base station radio device in an adjacent radio zone and, if the reception level exceeds a threshold value, the terminal requests the start-up of a soft handoff to an adjacent base station controller via a base station radio device now in communication. The handoff system of this type is called a terminal assisted handoff system, which can reduce the throughput of a device provided in a base station radio device for receiving a signal from a terminal and the throughput of a base station controller.

FIG. 7 is a block diagram showing in detail a structure of the terminal in the conventional terminal assisted handoff CDMA cellular system. The terminal 11 comprises an antenna 16, a receiver 17, a transmitter 23, a rake receiving section 15, a decoder 19, a reception level measuring section 21, an encoder 22 and a controller 20.

A signal received through the antenna 16 is converted into a baseband signal at the receiver 17 and then inputted to the rake receiving section 15. The terminal 11 includes only one receiver 17 for reduction in weight and size. However, if a frequency of an adjacent radio zone is the same as that of a radio zone now in communication, the terminal 11, while keeping the communication, can receive a pilot channel of the adjacent radio zone and measure a reception level thereof.

The rake receiving section 15 comprises a plurality of correlators $13_1$ to $13_n$ (n is an integer not less than 2). In the correlators $13_1$ to $13_n$, spreading codes of mutually different delay times are set for efficient reception of signals coming through various propagation paths as in multipath fading peculiar to the cellular system. Specifically, in the correlators $13_1$ to $13_{n-1}$, spreading codes used in a base station radio device now in communication are set for receiving signals from that base station radio device. On the other hand, in the correlator $13_n$, spreading codes used for pilot channels of base station radio devices covering adjacent radio zones are set.

The baseband signal inputted to the rake receiving section 15 is subjected to correlative demodulation at each of the correlators $13_1$ to $13_{n-1}$, then combined and decoded at the decoder 19, and sent to the controller 20. On the other hand, in the correlator $13_n$, the pilot channels of the adjacent radio zones are subjected to correlative demodulation. The reception level measuring section 21 derives reception levels of the pilot channels of the adjacent radio zones based on results of the correlative demodulation at the correlator $13_n$ and feeds them to the controller 20.

The controller 20 stores a preset threshold value for the start-up of a soft handoff and compares the reception levels of the pilot channels of the adjacent radio zones received from the reception level measuring section 21 with the preset threshold value. If the reception level exceeds the threshold value, the controller 20 produces a soft handoff start-up request signal carrying identification data of the base station radio device transmitting that pilot channel and transmits it to the base station radio device now in communication. The base station controller receives the start-up request signal via the base station radio device now in communication and transmits a soft handoff start-up signal to the base station radio device represented by the identification data. Then, the soft handoff is carried out and communication between the terminal and the base station radio device covering the adjacent radio zone is started.

FIG. 8 schematically shows a radio zone structure in the conventional terminal assisted handoff CDMA cellular system. The shown radio zone structure includes a plurality of adjacent radio zones A, B and C. The radio zone A is provided with a cell $24_1$ using a frequency $f_1$, the radio zone B is provided with a cell 251 using the frequency $f_1$ and a cell $25_m$ using a frequency $f_m$, and the radio zone C is provided with a cell $26_1$ using the frequency $f_1$ and a cell $26_m$ using the frequency $f_m$ The cells $24_1$, $25_1$ and $26_1$ of the radio zones A–C are adjacent to each other, and the cells $25_m$ and $26_m$ of the radio zones B and C are adjacent to each other. The cell using the frequency $f_m$ exists in each of the radio zones B and C, while it does not exist in the radio zone A. This is caused by difference in scale between the respective base station radio devices.

In the foregoing radio zone structure, the handoff is carried out without any problem when, for example, a terminal $11_1$ starting communication with the cell $25_m$ shifts to the cell $26_m$ of the radio zone C, or a terminal $11_2$ starting communication with the cell $25_1$ shifts to the cell $24_1$ of the radio zone A or to the cell $26_1$ of the radio zone C.

As described before, since the terminal 11 incorporates only one receiver 17, it can not convert a different frequency signal into a baseband signal during communication. Accordingly, if a frequency of a pilot channel of an adjacent radio zone for which the terminal 11 is headed (hereinafter, this radio zone will also be referred to as "headed radio zone") differs from a frequency now in use, the terminal 11 can not receive the pilot channel of the headed radio zone. For example, it is assumed that the terminal $11_1$ starting communication with the cell $25_m$ at the frequency $f_m$ shifts to the radio zone A. In this case, since there is no cell using the same frequency $f_m$ in the headed radio zone A, the terminal $11_1$ can not receive a pilot channel of the headed radio zone A. Specifically, since the terminal $11_1$ can not receive a pilot channel of the cell $24_1$ at the frequency $f_1$ in this case, it can not even carry out a handoff while changing the frequency. Accordingly, in the terminal assisted handoff system of the IS-95-A, when the terminal 11 moves to a radio zone where a frequency now in use can not be used, the handoff can not be achieved to cause disconnection in communication. The foregoing handoff to be carried out while changing a frequency is called a hard handoff.

SUMMARY OF THE INVENTION

It is therefore an object of the present invention to provide a terminal assisted handoff mobile communication system which is capable of smoothly carrying out a handoff even when a terminal moves to a radio zone where a frequency now in use can not be used.

Other objects of the present invention will become clear as the description proceeds.

According to one aspect of the present invention, there is provided a fixed facility for a mobile communication system including a mobile terminal. The fixed facility covers a first and a second radio zone which are assigned with a first and a second radio frequency, respectively. The mobile terminal is communicable with the fixed facility by the use of, as a current radio frequency, one of the first and the second radio frequencies and is capable of producing a request signal representative of request of a handoff in which the mobile terminal is communicable with the fixed facility by the use of another of the first and the second radio frequencies at a boundary area between the first and the second radio zones. The fixed facility comprises judging means responsive to the request signal for judging whether or not the second radio frequency is usable by the mobile terminal. The judging means produces a judgement result. The fixed facility further comprises signal transmitting means connected to the judging means for transmitting a command signal towards the mobile terminal through the current radio frequency in response to the judgement result. The command signal relates to the handoff.

According to another aspect of the present invention, there is provided a terminal assisted handoff mobile communication system which includes a host station, a plurality of radio base stations connected to the host station, and a mobile terminal, each of the radio base stations covering a corresponding radio zone including a plurality of cells of mutually different frequencies, the mobile terminal communicating with one of the radio base stations at a first frequency requests to the host station, based on measured reception levels of pilot channels transmitted from the adjacent radio base stations at the first frequency, start-up of a soft handoff to another of the radio base stations. The system further comprises a pilot channel transmitting means provided in at least one of the adjacent radio base stations, the at least one of the adjacent radio base stations not having a cell of the first frequency which exists in the radio zone of each of the other adjacent radio base stations, the pilot channel transmitting means constantly transmits a pilot channel using the first frequency. The system further comprises a determining means for, when the mobile terminal communicating with the one of the radio base stations at the first frequency receives the pilot channel from the pilot channel transmitting means and requests to the host station start-up of a soft handoff to the radio base station transmitting the received pilot channel, determining that the cell of the first frequency does not exist in the radio base station transmitting the received pilot channel, and a command signal transmitting means connected to the determining means for, in response to a determination result from the determining means, transmitting a hard handoff command signal commanding execution of a hard handoff to the mobile terminal using the first frequency being used in communication.

According to still another aspect of the present invention, there is provided a terminal assisted handoff mobile communication system which includes a host station, a plurality of mutually adjacent radio base stations connected to the host station, and a mobile terminal, each of the radio base stations covering a corresponding radio zone including a plurality of cells of mutually different frequencies, the mobile terminal communicating with one of the radio base stations at a first frequency requests to the host station, based on measured reception levels of pilot channels transmitted from the adjacent radio base stations at the first frequency, start-up of a soft handoff to another of the radio base stations. The system further comprises a reception level receiving means for receiving the reception levels of the pilot channels from the mobile terminal, comparing means connected to the reception level receiving means for comparing the reception levels received at the reception level receiving means with a preset threshold value, and a command signal transmitting means connected to the comparing means and responsive to a comparison result from the comparing means for transmitting a first command signal commanding execution of a soft handoff to the mobile terminal using the first frequency being used in communication when there exists the radio zone, other than the radio zone of the radio base station in communication with the mobile terminal, which shows the reception level greater than the preset threshold value, and for transmitting a second command signal commanding execution of a hard handoff to the mobile terminal using the first frequency being used in communication when there exists no radio zone showing the reception level greater than the preset threshold value.

DESCRIPTION OF THE PREFERRED EMBODIMENTS

Now, preferred embodiments of the present invention will be described hereinbelow with reference to the accompanying drawings.

Figure 1:
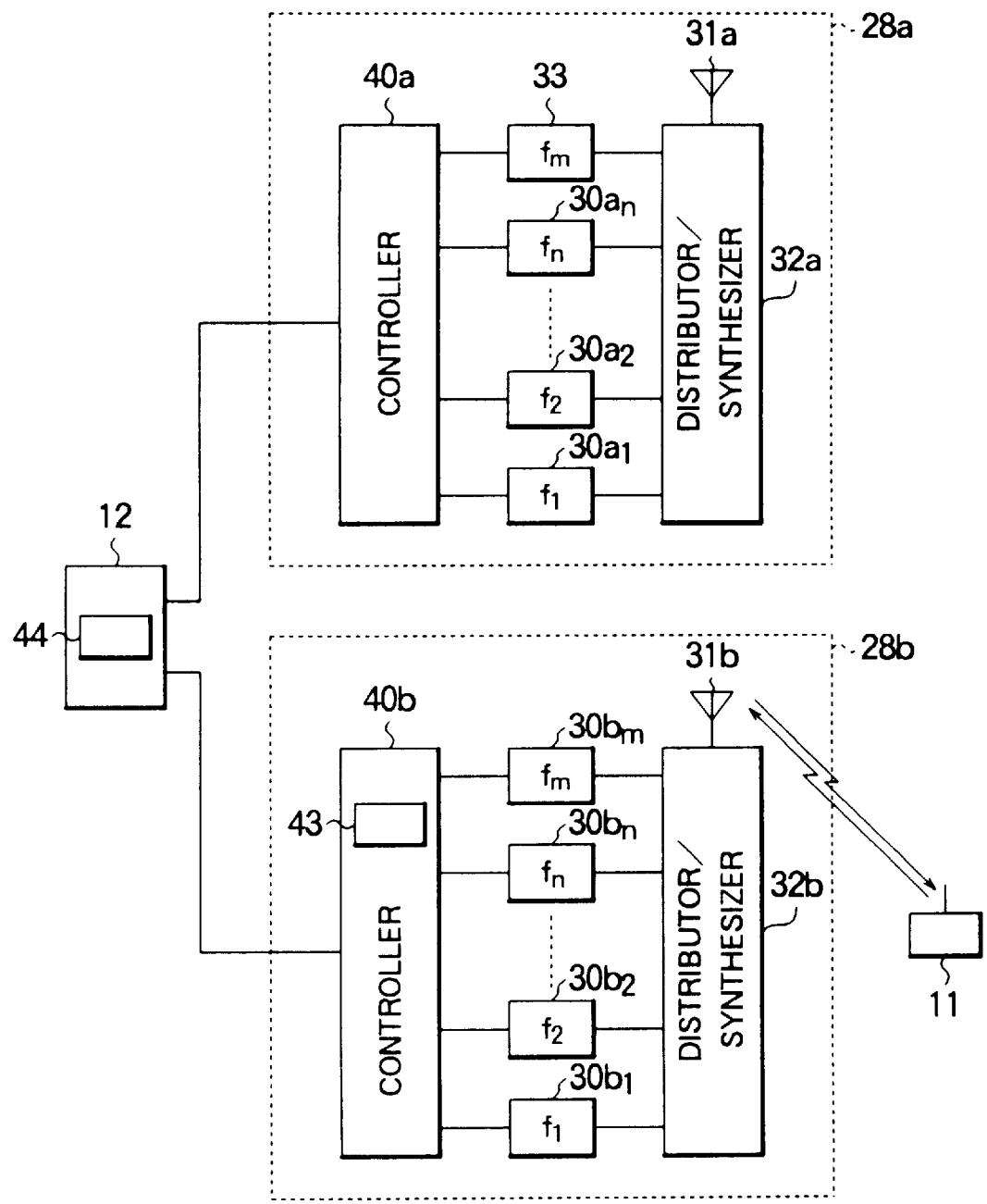
FIG. 1 is a block diagram showing a structure of a terminal assisted handoff CDMA cellular system according to a first preferred embodiment of the present invention.
Figure 2:
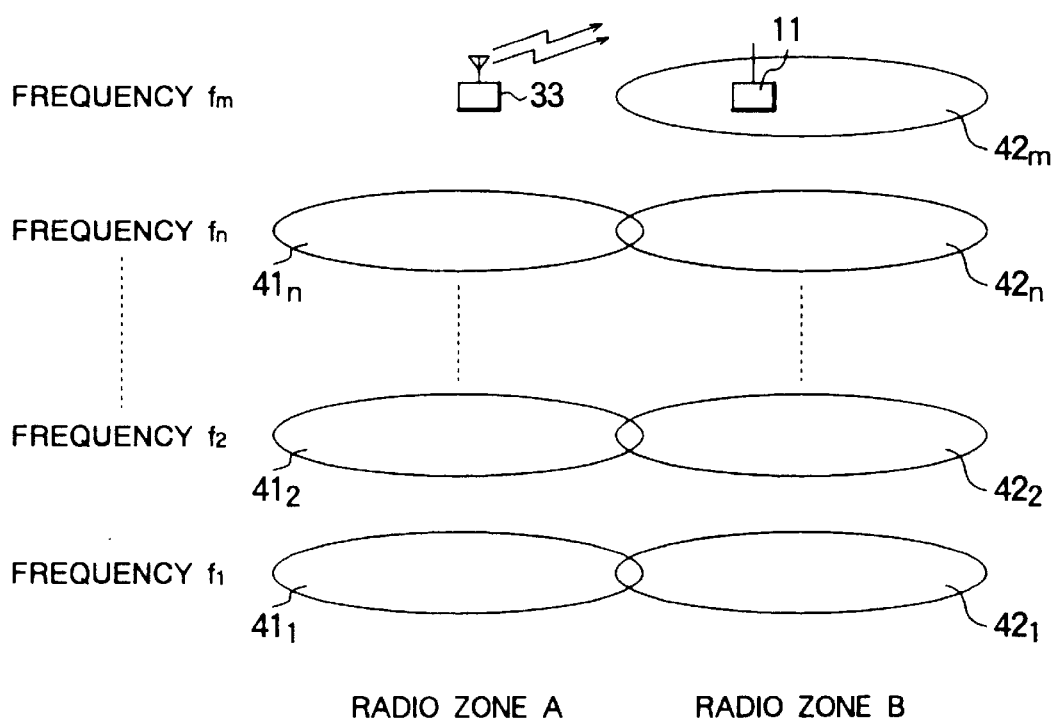
FIG. 2 is a diagram schematically showing structures of radio zones covered by base station radio devices shown in FIG. 1, respectively.
Figure 7:
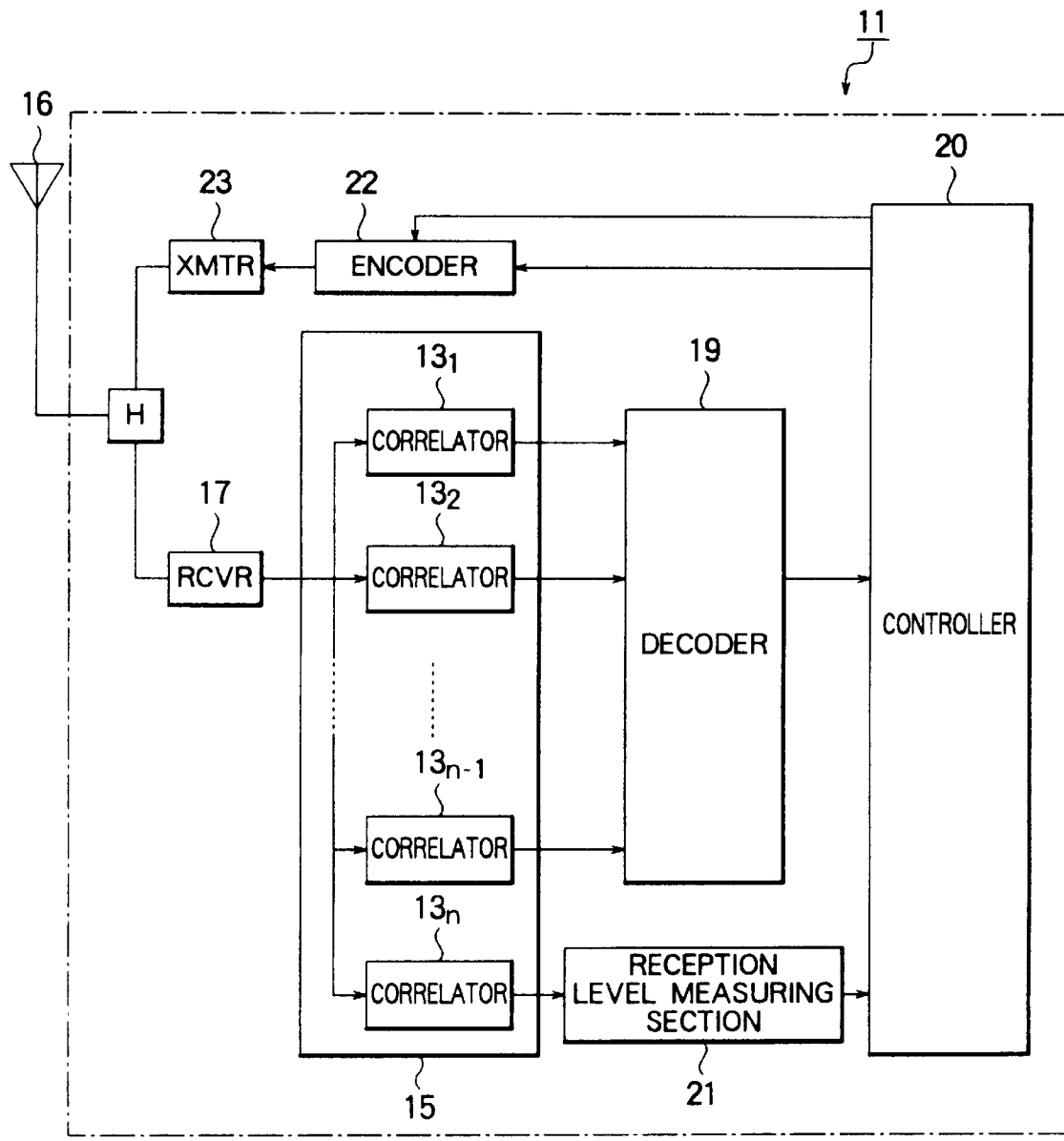
FIG. 7 is a block diagram showing in detail a structure of a terminal in the conventional terminal assisted handoff CDMA cellular system.
Figure 8:
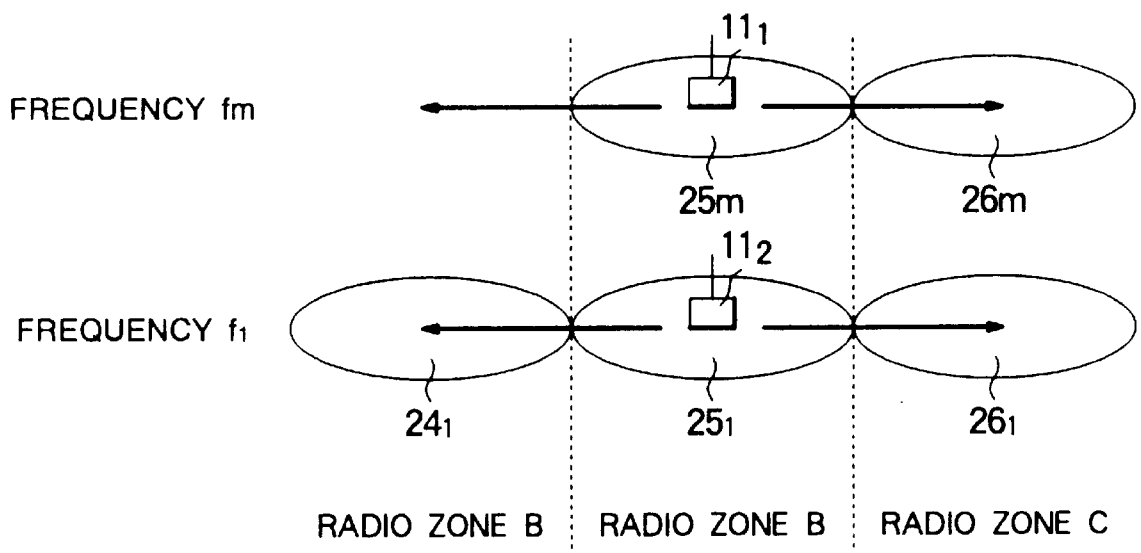
FIG. 8 is a diagram schematically showing a radio zone structure in the conventional terminal assisted handoff CDMA cellular system.

FIG. 1 is a block diagram showing a structure of a terminal assisted handoff CDMA cellular system according to the first preferred embodiment of the present invention. FIG. 2 is a diagram schematically showing structures of radio zones covered by base station radio devices shown in FIG. 1, respectively. Since the cellular system in this embodiment uses the known terminal 11 as it is, the following description will also refer to the structure of the terminal 11 shown in FIG. 7.

As shown in FIG. 1, base station radio devices 28a, 28b as radio base stations are connected to a base station controller 12 as a host station. A radio zone A covered by the base station radio device 28a is provided with cells $41_1$ to $41_n$ using frequencies $f_1$ to $f_n$, respectively. A radio zone B covered by the base station radio device 28b is provided with cells $42_1$ to $42_n$ using the frequencies $f_1$ to $f_n$, respectively, and a cell $42_m$ using a frequency $f_m$. The cells $41_1$ to $41_n$ and the cells $42_1$ to $42_n$ are adjacent to each other, while there are no cells adjacent to the cell $42_m$ of the radio zone B. This is caused by difference in scale between the base station radio devices 28a and 28b.

The base station radio device 28a comprises an antenna 31a, a distributor/synthesizer 32a, transceivers $30a_1$ to $30a_n$ corresponding to the frequencies $f_1$ to $f_n$, respectively, a pilot channel transmitter 33 for constantly transmitting a pilot channel of a frequency equal to the frequency $f_m$ of the cell $42_m$ in the adjacent radio zone B covered by the radio device 28b, and a controller 40a. The distributor/synthesizer 32a distributes a signal received from the terminal 11 via the antenna 31a to the transceivers $30a_1$ to $30a_n$, respectively, while combines signals from the transceivers $30a_1$ to $30a_n$ for transmission via the antenna 31a.

The base station controller 12 is provided with a determining section 44. When the terminal 11 in communication receives the pilot channel from the pilot channel transmitter 33 and requests the start-up of a soft handoff to the base station controller 12, the determining section 44 determines that there exists no cell of a frequency equal to the frequency $f_m$ of the pilot channel in the radio device 28a.

The base station radio device 28b comprises an antenna 31b, a distributor/synthesizer 32b, transceivers $30b_1$ to $30b_n$ corresponding to the frequencies $f_1$ to $f_n$, respectively, a transceiver $30b_m$ corresponding to the frequency $f_m$, and a controller 40b. The distributor/synthesizer 32b distributes a signal received from the terminal 11 via the antenna 31b to the transceivers $30b_1$ to $30b_n$, respectively, and combines signals from the transceivers $30b_1$ to $30b_n$ for transmission via the antenna 31b. The controller 40b is provided with a command signal transmitting section 43. In response to a determination result at the determining section 44, the command signal transmitting section 43 produces a hard handoff command signal for execution of a hard handoff using the frequency now in use for communication with the terminal 11 and transmits it to the terminal 11.

In the cellular system according to this embodiment, if a cell using a frequency equal to a frequency of a cell of a radio zone now in communication exists in an adjacent headed radio zone, a soft handoff can be smoothly achieved in the same manner as in the conventional cellular system. Accordingly, hereinbelow, explanation will be made mainly to the case where a cell using a frequency equal to a frequency of a cell of a radio zone now in communication does not exist in an adjacent headed radio zone.

For example, when the cell $42_m$ of the frequency $f_m$ in the radio zone B is allocated by the base station radio device 28b, the terminal 11 starts communication with the base station controller 12 via the transceiver $30b_m$ of the radio device 28b and the controller 40b. The terminal 11, while keeping the communication, receives the pilot channel of the frequency $f_m$ transmitted from the pilot channel transmitter 33 of the radio device 28a while moving to the radio zone A shown in FIG. 2. In the terminal 11, the reception level measuring section 21 measures a reception level of the pilot channel and gives it to the controller 20. The controller 20 transmits a reception level signal to the base station radio device 28b via the encoder 22, the transmitter 23 and the antenna 16.

The controller 20 compares the reception level of the pilot channel from the radio zone A with the preset threshold value. If the reception level exceeds the threshold value, the controller 20 determines that the terminal 11 reaches a position where a soft handoff to the radio zone A is possible, so as to produce a soft handoff start-up request signal carrying identification data of the base station radio device 28a and transmits it to the base station radio device 28b now in communication.

In the base station radio device 28b, the start-up request signal received via the antenna 31b and the distributor/synthesizer 32b is sent to the controller 40b via the transceiver $30b_m$ for the frequency $f_m$. Then, when the start-up request signal is sent to the base station controller 12 from the controller 40b, the determining section 44 determines that a cell of the frequency $f_m$ to which the terminal 11 will shift by a soft handoff does not exist in the base station radio device 28a identified by the start-up request signal. Accordingly, the base station controller 12 checks existence of cells in the base station radio devices 28a, 28b corresponding to a frequency to which a hard handoff is possible by the terminal 11. For example, if the cells $41_1$, $42_1$ using the frequency $f_1$ are both non-busy in the radio zones A and B covered by the radio devices 28a, 28b, a hard handoff command signal is produced at the command signal transmitting section 43 of the radio device 28b and transmitted to the terminal 11 via the distributor/synthesizer 32b and the antenna 31b.

Since the hard handoff command signal is transmitted at a frequency equal to the frequency $f_m$ now in use by the terminal 11, the terminal 11 can receive it as it is. In the terminal 11, according to the hard handoff command signal, the receiver 17 switches the frequency $f_m$ now in use to the frequency $f_1$, and thus the hard handoff to the cell $42_1$ of the frequency $f_1$ is carried out in the radio zone B of the radio device 28b now in communication. Thereafter, while keeping the communication with the cell $42_1$ using the frequency $f_1$, the terminal 11 produces a soft handoff start-up request signal carrying identification data of the radio device 28a at the controller 20 and transmits it to the radio device 28a via the radio device 28b and the base station controller 12. Accordingly, the terminal 11 smoothly carries out a soft handoff from the cell $42_1$ of the radio zone B to the cell $41_1$ of the radio zone A.

Figure 3:
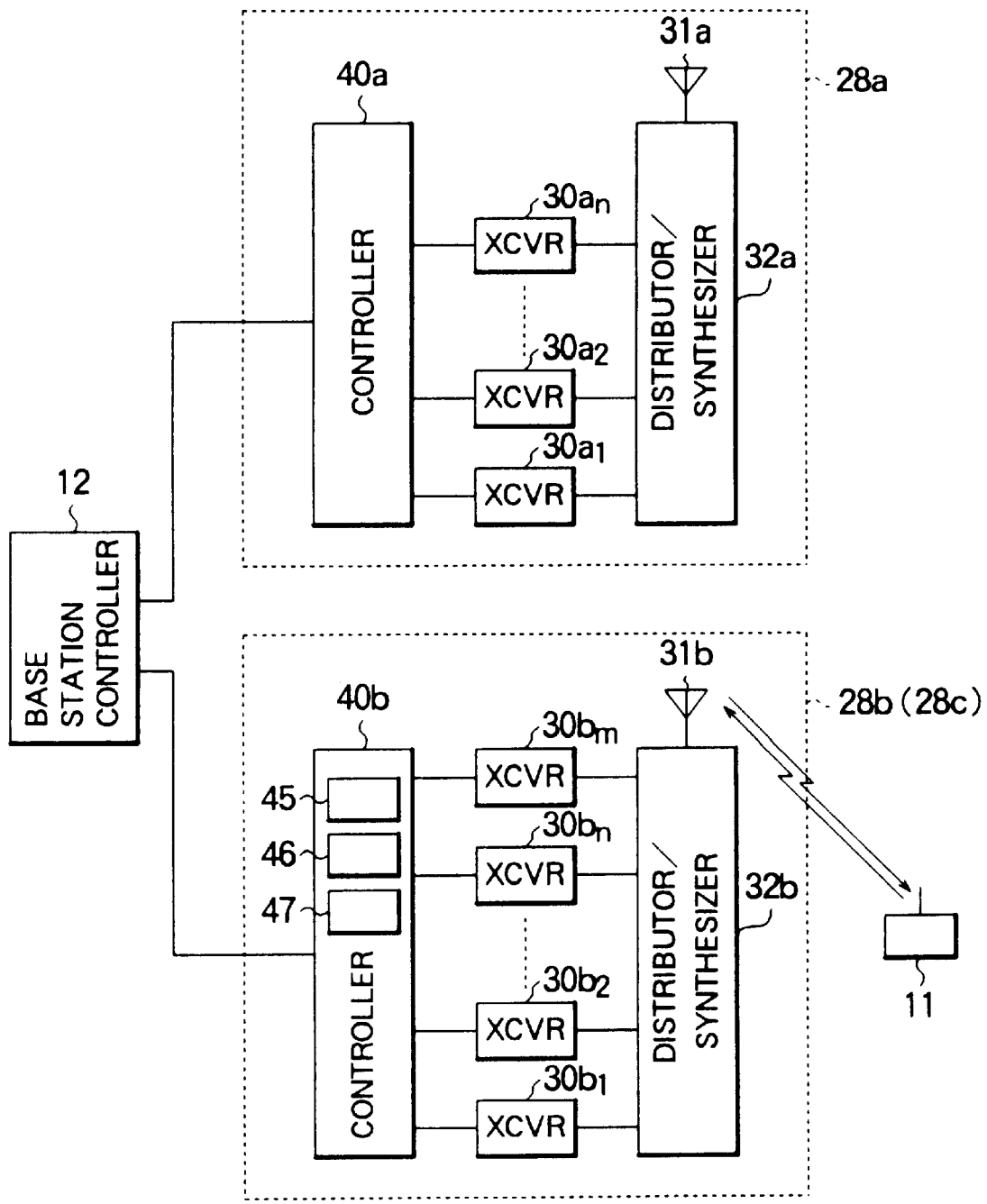
FIG. 3 is a block diagram showing a structure of a terminal assisted handoff CDMA cellular system according to a second preferred embodiment of the present invention.
Figure 4:
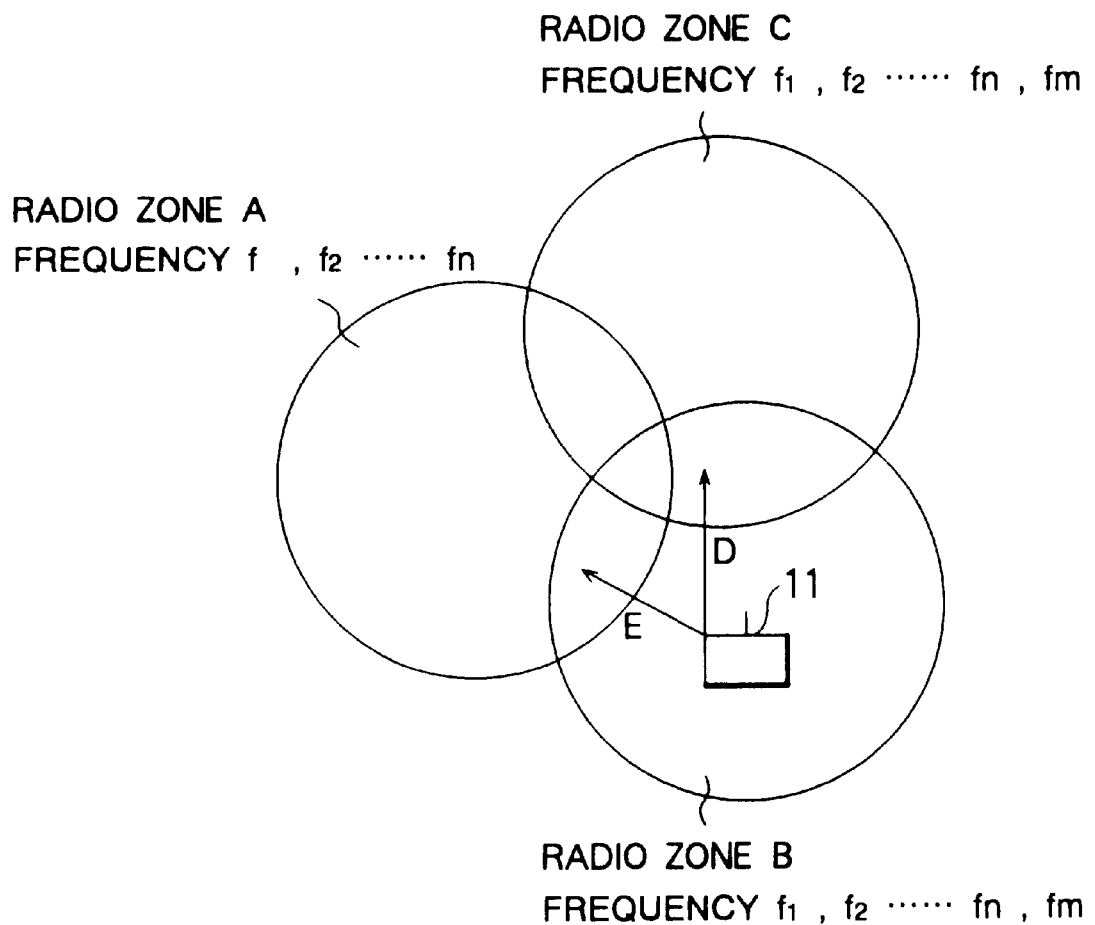
FIG. 4 is a diagram schematically showing radio zones, seen from above, covered by base station radio devices shown in FIG. 3, respectively.

Now, the second preferred embodiment of the present invention will be described. FIG. 3 is a block diagram showing a structure of a terminal assisted handoff CDMA cellular system according to this embodiment. FIG. 4 is a diagram schematically showing radio zones, seen from above, covered by base station radio devices shown in FIG. 3, respectively. In the figures, a base station radio device 28a covering a radio zone A, a base station radio device 28b covering a radio zone B and a base station radio device 28c covering a radio zone C are connected to a base station controller 12. Since the base station radio device 28c has the same structure as the base station radio device 28b, explanation thereof will be omitted.

The radio zone A is provided with a plurality of cells using frequencies $f_1$ to $f_n$, respectively. Each of the radio zones B and C is provided with a plurality of cells using the frequencies $f_1$ to $f_n$, respectively, and a cell using a frequency $f_m$. The cells using the frequencies $f_1$ to $f_n$ in the respective radio zones A, B and C are adjacent to each other, while the radio zone A has no cell adjacent to the cells using the frequencies $f_m$ in the radio zones B and C. This is caused by difference in scale between the base station radio devices 28a–28c.

The base station radio device 28a comprises an antenna 31a, a distributor/synthesizer 32a, transceivers $30a_1$ to $30a_n$ corresponding to the frequencies $f_1$ to $f_n$, and a controller 40a. The base station radio device 28b (28c) comprises an antenna 31b, a distributor/synthesizer 32b, transceivers $30b_1$ to $30b_n$ corresponding to the frequencies $f_1$ to $f_n$, a transceiver $30b_m$ corresponding to the frequency $f_m$, and a controller 40b.

The controller 40b includes a reception level receiving section 45, a comparing section 46 and a command signal transmitting section 47. The reception level receiving section 45 requests the terminal 11 to transmit reception levels of pilot channels from the base station radio devices 28a, 28b and 28c measured at the terminal 11, and receive them. The comparing section 46 compares the reception levels received at the reception level receiving section 45 with preset threshold values.

If, as a result of the comparison at the comparing section 46, there exists, other than the radio zone of the subject base station radio device (the base station radio device now in communication with the terminal 11), the radio zone transmitting the pilot channel whose reception level is greater than the threshold value, the command signal transmitting section 47 transmits a first command signal commanding execution of a soft handoff to the terminal 11 using a frequency now in use. On the other hand, if there exists no radio zone showing the reception level greater than the threshold value, the command signal transmitting section 47 transmits a second command signal commanding execution of a hard handoff to the terminal 11 using the frequency now in use.

Figure 5:
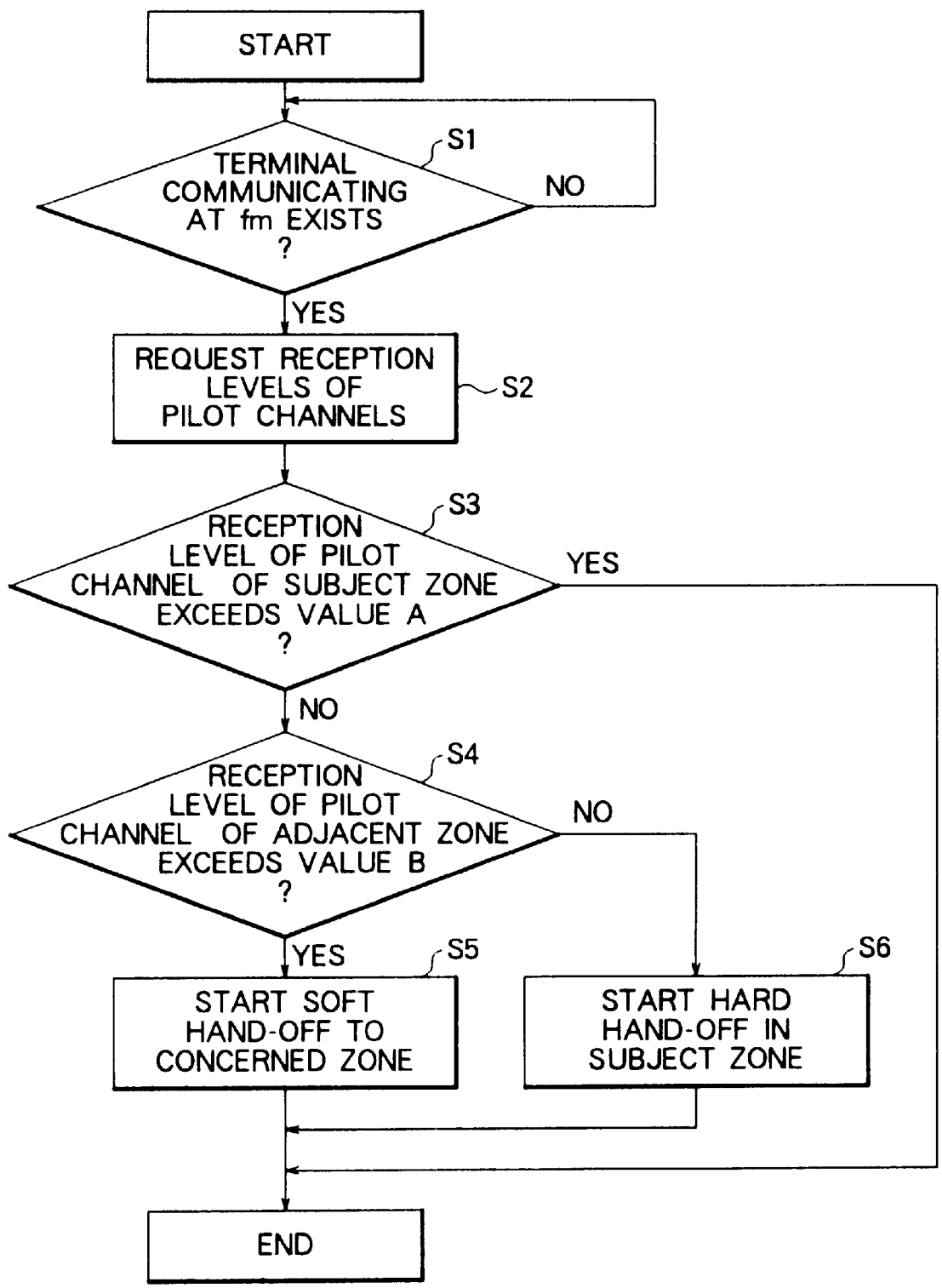
FIG. 5 is a flowchart showing an operation of the cellular system according to the second preferred embodiment of the present invention.
Figure 6:
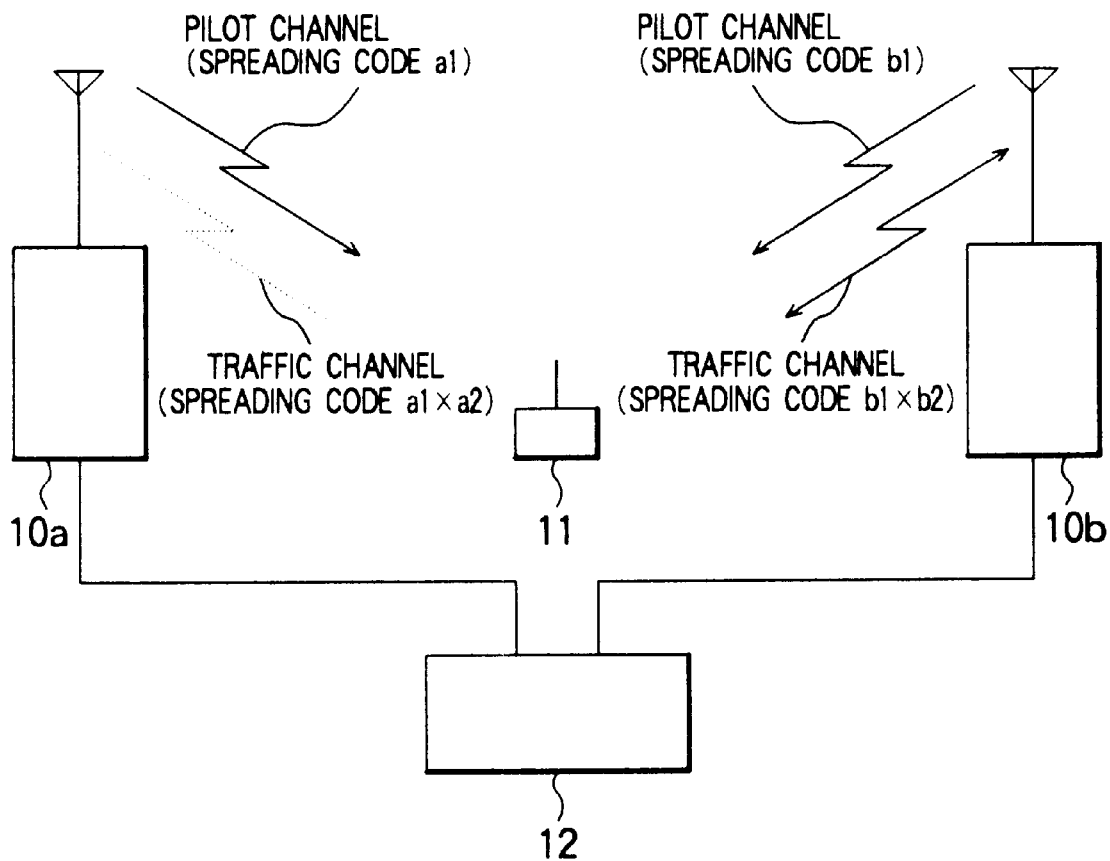
FIG. 6 is a diagram schematically showing a structure of a conventional terminal assisted handoff CDMA cellular system.

FIG. 5 is a flowchart showing an operation of the cellular system according to this embodiment. As in the foregoing first preferred embodiment, explanation will be made mainly to the case where a cell using a frequency equal to a frequency of a cell of a radio zone now in communication does not exist in an adjacent headed radio zone.

For example, when the cell using the frequency $f_m$ in the radio zone B is allocated by the base station radio device 28b, the terminal 11 starts communication with the base station controller 12 via the transceiver $30b_m$ of the radio device 28b and the controller 40b. While moving, for example, in a direction D toward the radio zone C in FIG. 4, the terminal 11, while keeping the communication, receives the pilot channels transmitted from the base station radio device 28b and all the adjacent base station radio devices 28a, 28c and measures reception levels thereof at the reception level measuring section 21. Further, the controller 20 transmits reception level signals to the base station radio device 28b via the encoder 22, the transmitter 23 and the antenna 16.

In the base station radio device 28b, it is checked whether there exists a terminal 11 communicating at the frequency $f_m$ in the radio zone B (step S1). If the terminal 11 communicating at the frequency $f_m$ exists in the radio zone B, the reception level receiving section 45 requests the terminal 11 to notify the reception levels of the pilot channels transmitted at the frequency $f_m$ from the base station radio devices 28a–28c, and receives them (step S2).

In the base station radio device 28b, the comparing section 46 compares the reception level of the pilot channel from the radio zone B among the reception levels received from the terminal 11 with a preset threshold value A of –12 dB (step S3). For example, if the reception level is –20 dB, the reception level is smaller than the threshold value A. This means that the terminal 11 is away from the radio zone B of the base station radio device 28b more than a predetermined distance and thus needs to shift to another cell by a handoff.

Subsequently, the comparing section 46 compares the reception levels of the pilot channels from the radio zones A and C, other than that from the radio zone B, among the reception levels received from the terminal 11 with a preset threshold value B of –16 dB (step S4). In this case, since the cell using the frequency $f_m$ does not exist in the radio zone A but exists only in the radio zone C, if the reception level of the pilot channel of the radio zone C exceeds the threshold value B, it means that a soft handoff to the cell of the frequency $f_m$ of the radio zone C is possible. Accordingly, the command signal transmitting section 47 transmits a first signal commanding execution of a soft handoff to the terminal 11 using the frequency now in use (step S5). Simultaneously, the base station radio device 28b transmits a soft handoff start-up request signal to the base station radio device 28c via the base station controller 12, so that the soft handoff to the cell of the frequency $f_m$ of the radio zone C is carried out.

On the other hand, when the terminal 11 communicating with the base station radio device 28b moves in a direction E toward the radio zone A in FIG. 4, there is no cell using the frequency $f_m$ in the headed radio zone A. In this case, at step S4, there is no reception level of the pilot channel exceeding the threshold value B. Thus, in the base station radio device 28b, the command signal transmitting section 47 transmits a second signal commanding execution of a hard handoff in the subject radio zone B to the terminal 11 using the frequency now in use.

In the terminal 11, according to the received second signal, the receiver 17 switches the frequency $f_m$ now in use to, for example, the frequency $f_1$ so as to carry out the hard handoff to the cell using the frequency $f_1$ in the radio zone B of the base station radio device 28b now in communication.

Thereafter, the terminal 11, while keeping the communication with the cell of the frequency $f_1$, produces, at the controller 20, a soft handoff start-up request signal carrying identification data of the base station radio device 28a and transmits it to the radio device 28a via the radio device 28b and the base station controller 12. Accordingly, the terminal 11 smoothly carries out a soft handoff to the cell of the frequency $f_1$ in the radio zone A from the cell of the frequency $f_1$ in the radio zone B.

In the foregoing first and second preferred embodiments, the terminal 11 first carries out the hard handoff to the cell of a different frequency in the radio zone of the subject base station radio device (the base station radio device communicating with the terminal 11), and then carries out the soft handoff to the cell of the same frequency in the adjacent radio zone. However, it may also be arranged that the terminal 11 carries out a hard handoff directly to a cell of a different frequency in an adjacent radio zone from a radio zone of the subject base station radio device.

As described above, in the terminal assisted handoff mobile communication system according to each of the foregoing first and second preferred embodiments, even when a terminal moves to a radio zone where a frequency now in use can not be used, a handoff can be carried out smoothly.

While the present invention has been described in terms of the preferred embodiments, the invention is not to be limited thereto, but can be embodied in various ways without departing from the principle of the invention as defined in the appended claims.

What is claimed is:

1. A fixed facility for a mobile communication system including a mobile terminal, said fixed facility covering a first and a second radio zone which are assigned with a first and a second radio frequency, respectively, said mobile terminal being communicable with said fixed facility by the use of, as a current radio frequency, one of said first and said second radio frequencies and being capable of producing a request signal representative of request of a handoff in which said mobile terminal is communicable with said fixed facility by the use of the other of said first and said second radio frequencies at a boundary area between said first and said second radio zones, said fixed facility comprising:

judging means responsive to said request signal for judging whether or not said second radio frequency is usable by said mobile terminal, said judging means producing a judgement result; and signal transmitting means connected to said judging means for transmitting a command signal towards said mobile terminal through said current radio frequency in response to said judgement result, said command signal relating to said handoff, wherein said handoff selectively comprises any of a soft handoff and a hard handoff, wherein said command signal for a hard handoff is transmitted on said current radio frequency until a new connection is established, said hard handoff selectively establishing said new connection in one of said first and said second radio zones and using the other of said first and said second radio frequencies at said boundary area.

2. The fixed facility as claimed in claim 1, wherein said first radio zone is further assigned with an additional radio frequency which is the same as said second radio frequency, said second radio zone being further assigned with an additional radio frequency which is equal to said first radio frequency, said mobile terminal being communicable with said fixed facility by the use of one of said additional radio frequencies in place of said current radio frequency.

3. The A fixed facility as claimed in claim 1, further comprising:

a host station including said signal transmitting means;

a first radio base station connected to said host station for covering said first radio zone; and a second radio base station connected to said host station for covering said second radio zone and having a pilot channel transmitting means for transmitting a pilot channel using said first radio frequency, said mobile terminal being responsive to said pilot channel to produce said request signal, said judging means being included in each of said first and said second radio base stations and judging whether or not said second radio base station uses a radio frequency which is equal to said first radio frequency.

4. A fixed facility for a mobile communication system including a mobile terminal, said fixed facility covering a first and a second radio zone which are assigned with a first and a second radio frequency, respectively, said mobile terminal being communicable with said fixed facility by the use of, as a current radio frequency, one of said first and said second radio frequencies and being capable of producing a request signal representative of request of a handoff in which said mobile terminal is communicable with said fixed facility by the use of another of said first and said second radio frequencies at a boundary area between said first and said second radio zones, said fixed facility comprising:

judging means responsive to said request signal for judging whether or not said second radio frequency is usable by said mobile terminal, said judging means producing a judgement result; and signal transmitting means connected to said judging means for transmitting a command signal towards said mobile terminal through said current radio frequency in response to said judgement result, said command signal relating to said handoff, wherein each of said first and said second radio base stations produces a pilot channel, said mobile terminal being responsive to said pilot channel to produce a reception level of said pilot channel, said judging means further comprising:
receiving means for receiving said reception level; and
comparing means connected to said receiving means and said signal transmitting means for comparing said reception level with a preset threshold value to produce a comparison result,
said signal transmitting means transmitting, as said command signal, a first command signal to said mobile terminal by the use of said current radio frequency in response to said comparison result when said reception level is greater than said preset threshold value, and transmitting, as said command signal, a second command signal to said mobile terminal by the use of said current radio frequency in response to said comparison result when said reception level is not greater than said preset threshold value, said first command signal commanding execution of a soft handoff in which said mobile terminal is communicable with said fixed facility without a change of frequency at said boundary area, said second command signal commanding execution of a hard handoff in which said mobile terminal is communicable with said fixed facility with a change of frequency at said boundary area.

5. A terminal assisted handoff mobile communication system including a host station, a plurality of radio base stations connected to said host station, and a mobile terminal, each of said radio base stations covering a corresponding radio zone including a plurality of cells of mutually different frequencies, said mobile terminal communicating with one of the radio base stations at a first frequency requests to said host station, based on measured reception levels of pilot channels transmitted from the adjacent radio base stations at said first frequency, start-up of a soft handoff to another of the radio base stations, said system further comprising:
a pilot channel transmitting means provided in at least one of the adjacent radio base stations, said at least one of the adjacent radio base stations not having a cell of said first frequency which exists in the radio zone of each of the other adjacent radio base stations, said pilot channel transmitting means constantly transmitting a pilot channel using said first frequency;
a determining means for, when the mobile terminal communicating with said one of the radio base stations at said first frequency receives the pilot channel from said pilot channel transmitting means and requests to said host station start-up of a soft handoff to the radio base station transmitting the received pilot channel, determining that the cell of said first frequency does not exist in the radio base station transmitting the received pilot channel; and
a command signal transmitting means connected to said determining means and responsive to a determination result from said determining means for transmitting a hard handoff command signal commanding execution of a hard handoff to said mobile terminal using said first frequency being used in communication.

6. A terminal assisted handoff mobile communication system as claimed in claim 5, wherein said mobile terminal, in response to the hard handoff command signal from said command signal transmitting means, carries out the hard handoff to a cell of a second frequency other than said first frequency in the radio zone covered by the radio base station communicating with said mobile terminal.

7. A terminal assisted handoff mobile communication system as claimed in claim 5, wherein said mobile terminal, in response to the hard handoff command signal from said command signal transmitting means, carries out the hard handoff directly to a cell of a second frequency other than said first frequency in the radio zone covered by the radio base station transmitting said received pilot channel.

8. A terminal assisted handoff mobile communication system including a host station, a plurality of mutually adjacent radio base stations connected to said host station, and a mobile terminal, each of said radio base stations covering a corresponding radio zone including a plurality of cells of mutually different frequencies, said mobile terminal communicating with one of the radio base stations at a first frequency requests to said host station, based on measured reception levels of pilot channels transmitted from the adjacent radio base stations at said first frequency, start-up of a soft handoff to another of the radio base stations, said system further comprising:
a reception level receiving means for receiving said reception levels of the pilot channels from said mobile terminal;
a comparing means connected to said reception level receiving means for comparing the reception levels received at said reception level receiving means with a preset threshold value; and
a command signal transmitting means connected to said comparing means and responsive to a comparison result from said comparing means for transmitting a first command signal commanding execution of a soft handoff to said mobile terminal using said first frequency being used in communication when there exists the radio zone, other than the radio zone of the radio base station in communication with said mobile terminal, which shows the reception level greater than the preset threshold value, and for transmitting a second command signal commanding execution of a hard handoff to said mobile terminal using said first frequency being used in communication when there exists no radio zone showing the reception level greater than the preset threshold value.

9. A terminal assisted handoff mobile communication system as claimed in claim 8, wherein said mobile terminal, in response to the second command signal from said command signal transmitting means, carries out the hard handoff to a cell of a second frequency other than said first frequency in the radio zone covered by the radio base station communicating with said mobile terminal.

10. A terminal assisted handoff mobile communication system as claimed in claim 8, wherein said mobile terminal, in response to the second command signal from said command signal transmitting means, carries out the hard handoff directly to a cell of a second frequency other than said first frequency in the radio zone covered by the radio base station transmitting said received pilot channel.

11. A fixed facility for a mobile communication system including a mobile terminal, said fixed facility covering a first and a second radio zone which are assigned with a first and a second radio frequency, respectively, said mobile terminal being communicable with said fixed facility by the use of, as a current radio frequency, one of said first and said second radio frequencies and being capable of producing a request signal representative of request of a handoff in which said mobile terminal is communicable with said fixed facility by the use of the other of said first and said second radio frequencies at a boundary area between said first and said second radio zones, said fixed facility comprising:
a determining device responsive to said request signal for determining whether or not said second radio frequency is usable by said mobile terminal, said determining device producing a determination result; and a command signal transmitter connected to said determining device for transmitting a command signal towards said mobile terminal through said current radio frequency in response to said determination result, said command signal relating to said handoff, wherein said command signal for a hard handoff is transmitted on said current radio frequency until a new connection is established, said hard handoff selectively establishing said new connection in one of said first and said second radio zones and using the other of said first and said second radio frequencies at said boundary area.

12. The fixed facility as claimed in claim 11, wherein said first radio zone is further assigned with an additional radio frequency which is same to said second radio frequency, said second radio zone being further assigned with an additional radio frequency which is equal to said first radio frequency, said mobile terminal being communicable with said fixed facility by the use of one of said additional radio frequencies in place of said current radio frequency.

13. The fixed facility as claimed in claim 11, further comprising:

a host station including said command signal transmitter;

a first radio base station connected to said host station for covering said first radio zone; and a second radio base station connected to said host station for covering said second radio zone and having a pilot channel transmitter for transmitting a pilot channel using said first radio frequency, said mobile terminal being responsive to said pilot channel to produce said request signal, said determining device included in each of said first and said second radio base stations and determining whether or not said second radio base station uses a radio frequency which is equal to said first radio frequency.

14. A communication system including:

a fixed facility;

and a mobile communication terminal being communicable with said fixed facility, said fixed facility covering a first and a second radio zone which are assigned with a first and a second radio frequency, respectively, said mobile terminal being communicable with said fixed facility by using, as a current radio frequency, one of said first and said second radio frequencies and being capable of producing a request signal representative of request of a handoff in which said mobile terminal is communicable with said fixed facility by using the other of said first and said second radio frequencies at a boundary area between said first and said second radio zones, said fixed facility comprising:

a determining device responsive to said request signal for determining whether or not said second radio frequency is usable by said mobile terminal, said determining device producing a determination result; and a command signal transmitter connected to said determining device for transmitting a command signal towards said mobile terminal through said current radio frequency in response to said determination result, said command signal relating to said handoff, wherein said command signal for a hard handoff is transmitted on said current radio frequency until a new connection is established, said hard handoff selectively establishing said new connection in one of said first and said second radio zones and using the other of said first and said second radio frequencies at said boundary area.

15. The communication system as claimed in claim 14, wherein said first radio zone is further assigned with an additional radio frequency which is same to said second radio frequency, said second radio zone being further assigned with an additional radio frequency which is equal to said first radio frequency, said mobile terminal being communicable with said fixed facility by using one of said additional radio frequencies in place of said current radio frequency.

16. The communication system as claimed in claim 14, said fixed facility further comprising:

a host station including said command signal transmitter;

a first radio base station connected to said host station for covering said first radio zone; and a second radio base station connected to said host station for covering said second radio zone and having a pilot channel transmitter for transmitting a pilot channel using said first radio frequency, said mobile terminal being responsive to said pilot channel to produce said request signal, said determining device included in each of said first and said second radio base stations and determining whether or not said second radio base station uses a radio frequency which is equal to said first radio frequency.

* * * * *